(12) United States Patent
Beyrlé

(10) Patent No.: US 6,492,029 B1
(45) Date of Patent: *Dec. 10, 2002

(54) METHOD OF ENAMELING SUBSTRATES COMPRISED OF GLASS MATERIALS; ENAMEL COMPOSITION USED; AND PRODUCTS OBTAINED THEREBY

(75) Inventor: Andre Beyrlé, Tracy le Val (FR)

(73) Assignee: Saint-Gobain Glass France, Courbevoie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/501,307

(22) Filed: Jul. 12, 1995

Related U.S. Application Data

(63) Continuation-in-part of application No. 08/439,796, filed on May 12, 1995, now abandoned, which is a division of application No. 08/091,815, filed on Jul. 13, 1993, now Pat. No. 5,431,966, which is a continuation-in-part of application No. 07/826,414, filed on Jan. 27, 1992, now abandoned.

(30) Foreign Application Priority Data

Jan. 25, 1991 (FR) ............................................. 91 00871

(51) Int. Cl.$^7$ ................................................ B32B 9/00
(52) U.S. Cl. ............ 428/428; 106/287.19; 106/287.34; 106/435; 106/454; 106/457; 106/475; 106/489; 106/903; 252/282; 427/375; 427/376.2; 427/379; 427/553; 428/426; 428/688

(58) Field of Search ............................... 427/376.2, 553, 427/375, 379; 428/426, 428, 688; 106/287.34, 287.19, 435, 454, 457, 475, 489, 903; 252/282

(56) References Cited

U.S. PATENT DOCUMENTS

| | | | | |
|---|---|---|---|---|
| 4,069,186 A | * | 1/1978 | Ramig | ................. 260/29.6 RB |
| 4,490,287 A | | 12/1985 | Hardwick et al. | |
| 4,606,748 A | | 8/1986 | Blake et al. | |
| 4,959,090 A | * | 9/1990 | Reinherz | ..................... 65/60.4 |
| 4,983,196 A | * | 1/1991 | Stotka | ........................... 65/24 |
| 5,431,966 A | * | 7/1995 | Daude et al. | ........... 427/375 X |
| 5,605,591 A | * | 2/1997 | Beyrle et al. | ................ 156/106 |

FOREIGN PATENT DOCUMENTS

| | | |
|---|---|---|
| DE | 2734147 | 11/1991 |
| FR | 2 458 323 | 2/1981 |
| FR | 0 074 314 | 3/1983 |
| FR | 0 174 893 | 3/1986 |
| FR | 0 446 114 A1 | 11/1991 |

* cited by examiner

*Primary Examiner*—Bernard Pianalto
(74) *Attorney, Agent, or Firm*—Oblon, Spivak, McClelland, Maier & Neustadt, P.C.

(57) ABSTRACT

The invention relates to a novel method of enameling substrates comprised of glass or vitroceramic material, according to which method the enamel composition contains graphite as a component, with the aim of improving the mechanical properties of the enameled substrate and/or conferring anti-adhesive properties on the composition. The invention also relates to the composition, and the enameled substrates obtained.

26 Claims, No Drawings

METHOD OF ENAMELING SUBSTRATES COMPRISED OF GLASS MATERIALS; ENAMEL COMPOSITION USED; AND PRODUCTS OBTAINED THEREBY

This is a continuation-in-part of Ser. No. 08/439,796, filed May 12, 1995 (abandoned), which is a division of Ser. No. 08/091,815, filed Jul. 13, 1993 (now U.S. Pat. No. 5,431,966), which is a continuation-in-part of Ser. No. 07/826,414, filed Jan. 27, 1992 (abandoned).

The invention relates to the deposition of enamels on a glass substrate, particularly a glass pane. The invention particularly concerns a novel method of producing an enamel layer on a substrate comprised of glass; further an enamel composition suitable for use in producing an enamel layer on a glass substrate; and the enameled products obtained.

The term "enamel" as used herein will be understood to mean the enamel composition or paste which one applies to the glass, and/or the enamel layer formed, at various stages of the production method described hereinbelow.

The term "substrate comprised of glass material(s)" will be understood to mean any glass-based substrate, particularly substrates comprised of glass proper (e.g. glass panes), but also a substrate comprised partly of crystalline materials and partly of glass, such as a substrate comprised of vitro-ceramic materials (used, e.g., for certain cooktops).

Enamels are well known in the art, and are particularly used on substrates comprised of glass proper, such as vehicle glass panes, architectural glass panes, and mirrors. Enamels have been used to form borders, decorative layers, and protective layers (masks) against UV radiation. These may be used particularly for protection of adhesive layers used to mount the glass in a window opening of a vehicle body, e.g. in the case of a windshield or a rear window, or to mount of accessories, e.g. rear-view mirrors; or to protect collector strips for arrays of heating elements; etc. Enamels are also used for coating vitroceramic substrates, such as cooktops.

The enamel used for these applications is generally formed from a powder comprising a glass frit (vitreous matrix) and (possibly) colorant pigments, wherewith the frit and the pigments are based on metal oxides, and a medium, known as the vehicle, which facilitates application of the enamel composition to the substrate, and adhesion of the composition to the substrate at the time of application.

Various methods may be used to apply the enamel to the substrate, e.g. spray painting, serigraphy, roll-coating, etc.

Preferably, serigraphy is used, which enables a wide variety of layer shapes and structures to be produced, and is highly reproducible.

In a preferred method of producing the enamel layer, the enamel is applied to the substrate by serigraphy, the wet coating which has been applied is dried to the point of good adhesion to the substrate and a general cohesion sufficient such that the enameled substrate can be handled without marring the coating, (possibly) additional coats are likewise applied and dried, and, finally, the enamel coat(s) is/are subjected to a heat treatment at high temperature, whereby the enamel is vitrified to produce the final coating.

The enamel coatings may result in deterioration of certain mechanical properties of the enameled substrate as compared to the un-enameled substrate. For glass substrates which must meet certain safety requirements in architectural or automotive applications, particularly applications for automobile sunroofs, such requirements may be quite stringent, particularly as to impact resistance (dropping sphere test, ANSI 26.1).

A related problem is that of satisfying requirements for protection against UV radiation, which specify that an enamel coating must have a certain opacity. Quite evidently, the opacity depends on the thickness of the enamel coating. In the case of a coating intended to protect a strip of adhesive, the coating thickness must generally be greater than 30 micron in the wet state (when the coating has been applied to the substrate prior to drying and firing of said coating), which approximately corresponds to 20 micron coating thickness after the firing and is regarded as a criterion for proper thickness of an enamel coating. Consequently, the amount of enamel required to be used is high, with attendant high cost.

Another requirement in current practice relates to manufacture of a glass pane with regions of different opacity, e.g. in producing a sunroof pane for an automobile, having an enamel with a fine screen pattern in the central region of the pane and a peripheral strip of highly opaque enamel. To achieve this variegated enameling it is generally necessary to make at least two passes (execute two serigraphy operations). In a first pass, enamel is deposited at least in the central zone, in the form of a fine screen pattern applied in a thin layer in order to achieve good definition of the pattern. Then in a second pass the peripheral strip is deposited, using a different serigraphy fabric, achieving a thicker coating having the required opacity. This method is time-consuming and costly, because two serigraphy stations are required, and two drying steps.

The opacity of an enamel can be increased by increasing the pigment content of the composition used to coat the glass; at the same time, the thickness of the coating can be reduced. However, increased pigment content in the enamel tends to result in poorer mechanical properties of the resulting enameled substrate.

A further problem associated with enameling of a glass substrate develops when enameled substrates are subjected to shaping operations (e.g. bending), generally concurrently with the firing of the enamel. In the course of the shaping, frequently the enamel covering the glass substrate undergoing shaping will stick to elements which contact the enameled article, which elements may be, e.g., curving-molds or may be other articles undergoing shaping at the same time. The adhesion results in, among other things, deterioration of the enamel layer.

Certain known enamels have anti-stick characteristics (also called "anti-adhesive" characteristics). They do not adhere, or only minimally adhere, to elements which contact them during shaping. These enamels are principally enamels comprising oxidizable metals or comprising components which form crystalline phases. However, they cause embrittlement of substrates to which they are applied, which embrittlement often exceeds that caused by traditional non-anti-adhesive enamels, and, further, they contribute to adverse changes in the mechanical properties of the resulting enameled substrates.

The invention eliminates the described drawbacks of the state of the art. The invention proposes a novel method of producing at least one enamel layer on at least a part of a glass substrate, which substrate may particularly be a glass frame. The method enables enameled substrates to be fabricated which have improved mechanical properties.

The invention consists of using graphite in enamel compositions for coating glass substrates. According to the invention, the graphite enables enameled substrates to be fabricated which have improved mechanical properties.

The invention proposes a method of enameling a glass substrate, particularly a glass pane, according to which method, with the aim of improving the mechanical properties of the enameled substrate, an enamel composition containing graphite is deposited on at least a part of the surface of the substrate, the resulting layer is (optionally) dried, and subsequently the enamel coating is fused or vitrified.

The invention also relates to an enamel composition for a glass substrate, which composition comprises a powder comprised of a glass frit and a pigment or pigments, a medium enabling the production of a material of a viscosity well-suited for the application of the composition to the substrate and facilitating a binding or adhesion to the substrate, and graphite;

and which composition is intended to enable production of an enameled substrate having improved physical properties. Advantageously, with the aim of obtaining enameled substrates having improved mechanical properties, the composition comprises at least 0.2 wt. %, preferably at least 0.5 wt. % of graphite (based on the total weight of the enamel composition).

The use of graphite in enamel compositions and in the described method affords a number of advantages. Notably, the glass substrate enameled with a graphite-containing enamel according to the invention displays less loss of strength and durability in comparison to a non-enameled substrate than do substrates enameled with the same enamel but without graphite.

The graphite in the enamel composition also confers anti-adhesive properties on the enamel, for many enamels according to the invention. Accordingly, the enamels do not exhibit such a stickiness during shaping operations that the enameling process is adversely affected. Thus another purpose for which graphite may be used in enamel compositions for coating of glass substrates is to render the compositions anti-sticking.

Beside enabling improvement of the mechanical properties of enameled substrates, the graphite facilitates the use of enamel compositions having a high pigment content (e.g. greater than 30–35 wt. %), wherewith the presence of the graphite compensates for the adverse changes in mechanical properties of the enameled substrates due to the higher pigment content. The use of graphite and/or an increase in the pigment content in the enamel enable(s) production of enamels with higher opacity, thereby enabling lower coating thicknesses.

The favorable relation of opacity to coating thickness which is enabled by the use of the inventive composition allows production of certain enameled glass panes wherewith the enamel coating can be applied in a single pass, whereas the use of known compositions would require at least two passes. In the example of an enameled glass pane for an automobile sunroof which pane is designed with a central region having a thin layer of enamel in a fine screen pattern and a peripheral region of high opacity, by adjusting the pigment content and/or graphite content in an enamel composition according to the invention, to meet the stringent requirements for opacity of the peripheral region with the use of a thin (shallow) enamel layer applied with only one pass corresponding to the application of a relatively thin coating.

Other advantages are afforded by the possibility of employing an enamel composition rendered more opaque by the presence of a higher pigment content, and/or the presence of graphite; e.g., one such advantage being that the coating of the substrate by a mask comprising a black primer can be suppressed under certain circumstances, and another being that the appearance of the surface may be enhanced.

A further advantage of the use of graphite in enamel compositions is that graphite only minimally changes the rheological properties of the enamel paste which relate to application of the paste to the substrate by means of serigraphy. If one were to use, e.g., carbon black instead of graphite, this advantage would be lost. Graphite of the also called "pyrolytic carbon" also has the advantage of being very resistant to the high temperatures used in the vitrification of the enamel. At these temperatures, on the order of 550–650° C. for enamels intended to cover substrates of glass proper (or on the order of 900° C. for enamels intended to cover vitroceramic substrates), the decomposition of the graphite is minimal to zero, and the graphite remains in the enamel. In comparison, carbon black would decompose to form carbon dioxide before reaching 550° C., leading to formation of a porous enamel.

As indicated supra, the graphite is preferably employed in the proportion of 0.2 wt. % (based on the total weight of the composition). The greater the content of graphite in the enamel, the more effective the graphite is in improving the mechanical properties of the resulting enameled substrate. However, if used in proportions above 20 wt. %, graphite may render the firing of the enamel more difficult.

The powder present in the enamel composition according to the invention, which powder is comprised of a glass frit and pigments, generally represents 60–90 wt. % of the total enamel composition.

The glass frit may be any known glass frit based on oxides, chosen, e.g., from among the oxides of silicon, lead, zinc, bismuth, titanium, zirconium, sodium, boron, lithium, potassium, calcium, aluminum, tin, vanadium, molybdenum, magnesium, etc.

The pigments used according to the invention may be chosen from among the compounds containing oxides of metals such as chromium, copper, iron, cobalt, or nickel, etc., or from among the chromates of copper, cobalt, etc.

Because the presence of the graphite compensates for the adverse changes in mechanical properties, pigments may be used in proportions greater than the usual proportions, as mentioned above, wherewith pigment contents of up to 70 wt. % may be employed (on the basis of the weight of the frit plus the pigments), which may be compared with the usual pigment contents not generally exceeding 30–35 wt %. Preferably, the higher the content of the pigments and/or graphite the lower the fusion point of the glass frit should be, in order to obtain a composition having a fusion point comparable to the usual fusion point of compositions according to the state of the art.

The medium (vehicle) present in the enamel composition according to the invention may be any medium ordinarily used in known enamel compositions. It may be comprised of solvents, diluents, oils (e.g. pine oils and other vegetable oils), resins (e.g. acrylic resins), petroleum fractions, filmogenic materials, etc.

The powder is worked into suspension in the medium to provide a paste composition suitable to be applied, e.g., by rolling or serigraphy or other printing-like techniques, onto a glass substrate.

The inventive enamel composition may advantageously be prepared from known enamel compositions or from components of known enamel compositions (e.g. glass frits). The preparation may consist merely of adding graphite to a known enamel composition or known component(s) of enamel compositions, rather than completely reformulating; similarly, it may be unnecessary to modify apparatus used in traditional enameling methods.

The glass substrate to which the described enamel composition is applied may be a bare glass substrate or one already covered with one or more layers of enamel. The substrate may comprise one or a combination of a plurality of glass sheets, and may be tempered to confer improved mechanical strength and durability and improved thermal properties. The inventive enameled substrate thus comprises at least one glass sheet covered on at least a part of one of its faces with a composition according to the invention.

In the inventive method of enameling glass substrates (particularly glass panes), the enamel composition is preferably applied to the substrate by serigraphy, followed by firing, wherewith the firing may occur in the course of the heat treatment connected with shaping and/or with tempering of the substrate. Generally, firing temperatures on the order of 600–700° C. are used for substrates comprising glass proper, and on the order of 900–1000° C. for vitroceramic substrates.

The enamel composition may also be applied by spraying in the nature of paint spraying, by coating onto a screen, roll-coating, etc.

Generally, the application of the composition is followed by drying, to enable sufficient adhesion and cohesion of the coating to and on the substrate, said drying being accomplished by means of, e.g. IR radiation, UV radiation, hot air, or microwave radiation. In the case of microwave heating, the graphite has the advantage of serving as a microwave dopant. In a case where a plurality of coatings are applied to a substrate, preferably each coating layer is dried before the next is applied, and the firing is carried out on all of the layers together.

Possible shaping and/or tempering of the glass substrate are carried out by known methods. In particular, gravity means may be utilized for the shaping, wherewith if laminated panes are to be produced the shaping may be performed on glass substrates in pairs; or molds may be utilized; and in the case of a substrate which is to be both shaped and tempered, the tempering may be carried out after the shaping of the enameled substrates, and in or on the same apparatus.

In the case where a plurality of glass substrate articles are to be shaped simultaneously, with the aim of producing laminated glass panes, the enamel is applied to at least one of the substrates, and the substrates are assembled, following which the shaping is carried out. The glass substrates are then mutually separated to enable insertion of at least one intermediately disposed film comprised of a different material, and the laminated glass pane is then produced by assembling the pieces and subjecting the structure to heating and pressure.

Other advantages and characteristics of the invention will be apparent from the following examples:

COMPARISON EXAMPLE 1

An enamel composition was prepared by mixing together the following:

100 parts by weight (pbw) of a powder comprising c. 16 wt. % $SiO_2$, c. 50 wt. % PbO, and c. 34 wt. % of other intermediate or modifier oxides, wherewith about 30 wt. % of said powder was represented by pigments based on iron-, chromium-, and cobalt oxides, and 25 pbw of a medium based on pine oil and comprised of acrylic resins in the amount of 3 wt. % (of said medium).

The composition was applied by serigraphy to a glass sheet 305×305 mm, followed by drying and then by firing at c. 640° C. The resulting enameled sheet was subjected to a test of impact strength (dropping sphere test, ANSI 26.1, test no. 6). The test involves a determination of the height of drop of a sphere of c. 227 g which results in breakage of the enameled sheet. A higher height index represents greater impact strength of the enameled substrate.

As a general guideline, for enameled glass panes used in producing automobile sunroofs or the like, the said height index should be at least 3.05 m.

In the present Example, the height index was c. 1.80 m.

A determination of the opacity of the enamel was also made. The opacity can be expressed in terms of optical density. As a general guideline, for an enamel coating intended to protect a strip of adhesive, the desired opacity correponds to an optical density of at least 3. The optical density of the enamel according to the present Example was measured with a densitometer, e.g. a Gretag$^{(R)}$ D 200 apparatus. The optical density measured was c. 3.2.

EXAMPLE 1

The method was as in Comparison Example 1, except that the following was added to the enamel composition of said Comparison Example:

15 pbw artificial or pyrolytic graphite, e.g. the product described as "1–2 micron synthetic graphite powder", supplied under the trade designation "28,286/3" by the firm Aldrich.

The height index in the dropping sphere test, for the enamel-coated substrate according to the invention (the present Example 1), was c. 4.4 m. Thus the presence of graphite in the enamel led to substantially improved mechanical properties of the enameled substrate.

The optical density of the enamel according to the present Example 1 was c. 4.2, which again represents an improvement.

Further, it was observed that the enamel according to the present Example 1 had anti-adhesive properties; and that only one pass was required instead of two, in serigraphic application of the enamel to a glass pane having two zones to be enameled with mutually different characteristics.

COMPARISON EXAMPLE 2

An enamel composition was prepared by mixing together the following:

100 parts by weight (pbw) of a powder comprising c. 25 wt. % $SiO_2$, c. 38 wt. % PbO, c. 7 wt. % $B_2O_3$, and c. 30 wt. % of other intermediate or modifier oxides wherewith about 20–25 wt. % of said powder was represented by pigments based on iron-, chromium-, and cobalt oxides, and 25 pbw of a medium based on pine oil and comprised of acrylic resins in the amount of 3 wt. % (of said medium).

The procedure was as in Example 1, wherewith a glass substrate coated with the enamel according to the present Comparison Example 2 was produced and underwent a determination of the mechanical properties. The height index in the dropping sphere test was c. 3.2 m.

COMPARISON EXAMPLE 3

The method was as in Comparison Example 2, except that 10 pbw of pigments such as copper chromates having a spinel structure was added to the enamel composition of said Comparison Example 2.

The height index in the dropping sphere test on a substrate coated with the enamel according to the present Comparison Example 3 was c. 2.5 m.

EXAMPLES 2, 3, AND 4

The method was as in Comparison Example 3, except that the following respective amounts of a graphite of the type used in Example 1 were added to the enamel composition of Comparison Example 3:

0.5 pbw graphite (Example 2).

1 pbw graphite (Example 3).

5 pbw graphite (Example 4).

The height indices in the dropping sphere test on the enameled substrates were as follows:

c. 3.1 m, for the enamel according to Example 2.

c. 3.3 m, for the enamel according to Example 3.

c. 3.8 m, for the enamel according to Example 4.

It is seen that the addition of even a small amount of graphite to the enamel can compensate for adverse changes in mechanical properties of an enameled substrate due to the addition of pigments to the enamel, and that the greater the amount of graphite added to the enamel composition the greater the improvement in mechanical properties of the enameled substrate.

The enamels according to the invention are used principally to coat substrates comprised of glass proper, such as glass panes, in automotive or architectural applications, or to coat substrates comprised of vitroceramic materials, such as materials of burner plates or hot plates.

What is claimed is:

1. A method of improving the mechanical properties of an enameled substrate, and/or conferring anti-adhesive properties on an enamel composition, said method comprising enameling a glass substrate by coating an enamel composition comprising graphite as a component thereof on at least a part of the surface of the substrate, and subsequently fusing or vitrifying the enamel coating.

2. The method of claim 1, wherein the glass substrate is a vitroceramic substrate.

3. The method according to claim 1 wherein said composition comprises:

a powder comprising a glass frit and a pigment or pigments, a medium, and graphite.

4. The method according to claim 3 wherein said composition comprises at least 0.2 wt. % graphite based on the total weight of said composition.

5. The process of claim 1, further comprising a drying step.

6. The method according to claim 1, wherein the composition is applied in a single serigraphic pass.

7. The method of claim 6 wherein said enamel composition further comprises:

a powder; and a medium, wherein said powder comprises a glass frit and at least one pigment.

8. The method of claim 1, wherein the glass substrate is a glass pane.

9. An enameled glass substrate comprising:

a glass substrate; and, an enamel composition coated on said substrate, wherein said enamel composition comprises:

graphite;

a powder comprising a glass frit and at least one pigment; and a medium.

10. An enamel composition, comprising:

graphite;

a powder; and a medium, wherein said powder comprises a glass frit and at least one pigment.

11. The enamel composition of claim 10, comprising at least 0.2 wt. % of said graphite based on the total weight of said composition.

12. The enamel composition of claim 11, comprising at least 0.5 wt. % of said graphite based on the total weight of said composition.

13. The enamel composition of claim 12, comprising 0.5–20 wt. % of said graphite based on the total weight of said composition.

14. The enamel composition of claim 10, comprising at least 3 wt. % of said pigment based on the total weight of said powder.

15. The enamel composition of claim 14, comprising 30–70 wt. % of said pigment based on the total weight of said powder.

16. The enamel composition of claim 10, comprising 60–90 wt. % of said powder based on the total weight of said composition.

17. A glass pane comprising at least one glass sheet coated, on at least a part of one of the faces of said sheet, with a composition according to claim 10.

18. A vitroceramic plate comprising at least one layer of vitroceramic material coated, on at least a part of one of the faces of said layer, with a composition according to claim 10.

19. The enamel composition of claim 10, wherein the medium is non-aqueous.

20. A process for enameling glass substrates, comprising the steps of:

depositing an enamel composition on a substrate; and heat-treating or firing, wherein said substrate comprises a glass material; and wherein said enamel composition comprises graphite.

21. The process of claim 20 wherein said enamel composition further comprises:

a powder; and a medium, wherein said powder comprises a glass frit and at least one pigment.

22. The process of claim 21 wherein said enamel composition comprises 30–70 wt. % of said pigment based on the total weight of said powder.

23. The process of claim 21 wherein said enamel composition comprises at least 0.2 wt. % of said graphite based on the total weight of said composition.

24. The process of claim 23 wherein said enamel composition comprises 0.5–20 wt. % of said graphite based on the total weight of said composition.

25. The process of claim 20, further comprising a drying step.

26. An enameled glass substrate prepared by a process comprising the steps of:

depositing an enamel composition comprising graphite on a substrate comprising a glass material; and heat-treating or firing said substrate.

* * * * *

UNITED STATES PATENT AND TRADEMARK OFFICE
CERTIFICATE OF CORRECTION

PATENT NO.   : 6,492,029 B1
DATED        : December 10, 2002
INVENTOR(S)  : Beyrlé

It is certified that error appears in the above-identified patent and that said Letters Patent is hereby corrected as shown below:

<u>Title page,</u>
Item [63], Related U.S. Application Data should read:

-- Related U.S. Application Data

[63] Continuation-in-part of application No. 08/091,815, filed on Jul. 13, 1993, now Pat. No. 5,431,966, which is a continuation-in-part of application No. 07/826,414, filed on Jan. 27, 1992, now abandoned. --

Signed and Sealed this

Sixteenth Day of September, 2003

JAMES E. ROGAN
*Director of the United States Patent and Trademark Office*